Patented May 1, 1934

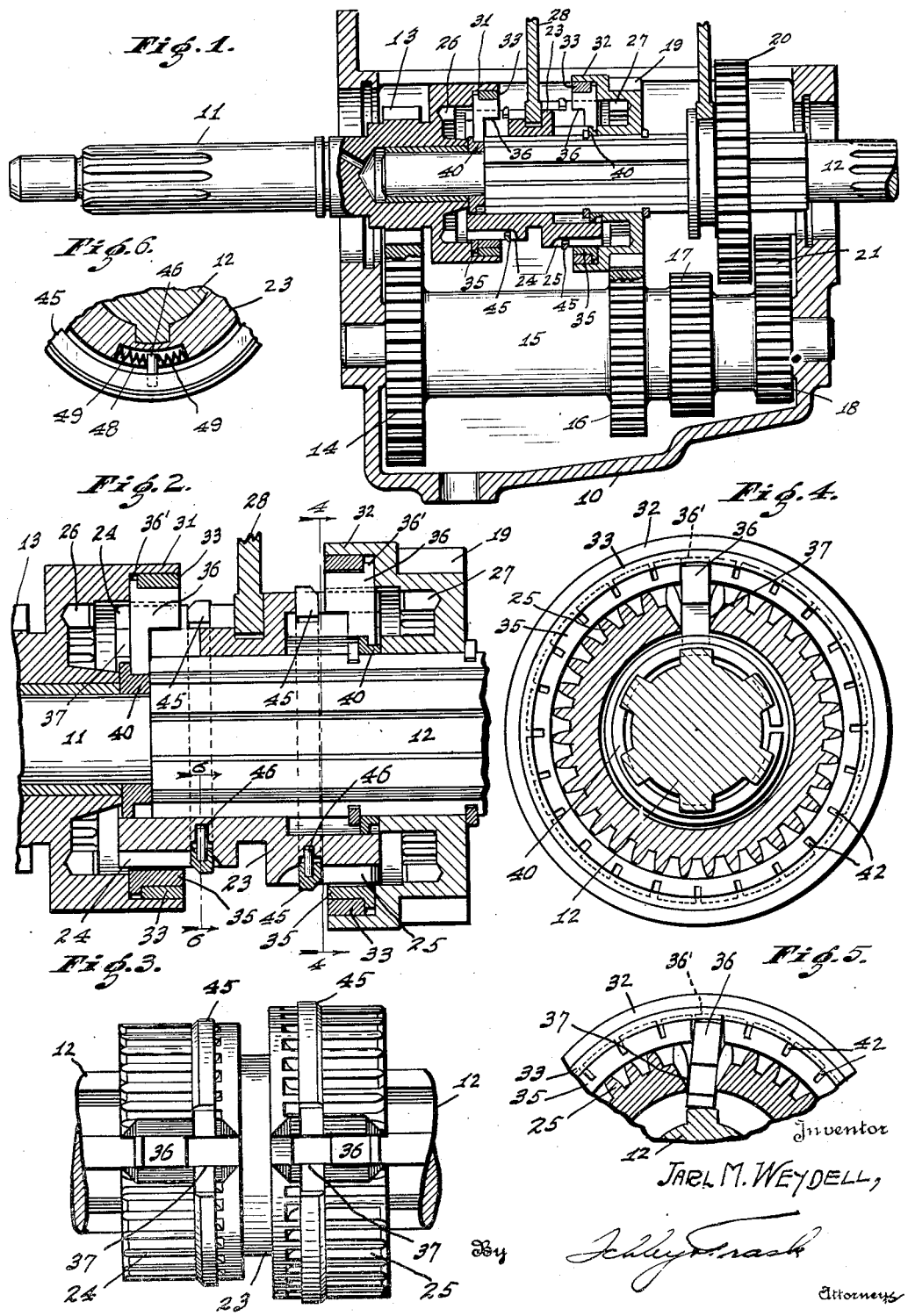

1,957,416

UNITED STATES PATENT OFFICE 1,957,416

SYNCHRONIZING MECHANISM FOR
CHANGE-SPEED TRANSMISSION

Jarl M. Weydell, Indianapolis, Ind., assignor of one-half to Edward E. Stout, Indianapolis, Ind.

Application July 29, 1931, Serial No. 553,798

7 Claims. (Cl. 192—53)

My invention is concerned with change-speed transmission mechanisms of the type in which any one of several trains of gearing may be rendered operative to interconnect driving and driven shafts. It is the object of my invention to provide for such a transmission synchronizing mechanism which will bring to substantially the same speed two parts which are about to be interconnected to render the transmission operative. More specifically, it is my object to produce a compact synchronizing mechanism of simple construction which, without the necessity for expenditure on the part of the operator, of greater effort than that necessary to shift the gears, will serve to effect the synchronization that is necessary to prevent clashing.

My invention is adapted for incorporation in a transmission having one or more pairs of coaxial clutch members, the two members of each pair being provided with an annular series of teeth that can be interengaged by relative axial movement of the clutch members to control operation of the transmission. Rotatable respectively with such two positive clutch members I provide the two parts of a friction clutch, one of such parts comprising a split ring the diameter of which can be changed to grip a co-operating surface on the other part. Preferably, the ring is arranged to grip the other part of the friction clutch by expansion; and in the preferred construction, the two sides of the slit in the ring are approximately radial and receive between them a dog or key which is tilted just prior to engagement of the two positive clutch members to expand the ring into firm frictional engagement with the other friction clutch-member.

The accompanying drawing illustrates my invention: Fig. 1 is a longitudinal section through a transmission mechanism of which my invention forms a part; Fig. 2 is a fragmental section similar to Fig. 1, but on an enlarged scale, showing details of two of the positive clutches; Fig. 3 is a plan showing the axially movable member of the positive-clutches; Fig. 4 is a transverse section on the line 4—4 of Fig. 2 showing the parts of the synchronizing mechanism in the positions they occupy when the synchronizing mechanism is inoperative; Fig. 5 is a fragmental section similar to Fig. 4, but showing the parts of the synchronizing mechanism in the positions they occupy when operative; and Fig. 6 is a fragmental section on the line 6—6 of Fig. 2.

My invention is not concerned with details of the change-speed transmission mechanism itself. The mechanism shown in the drawing comprises a casing 10 in which are mounted in coaxial relation a driving shaft 11 and a driven shaft 12. Within the casing 10, the shaft 11 is provided with a pinion 13 meshing with a gear 14 carried by a counter-shaft 15. Rotatable with the counter-shaft are a second-speed gear 16, a low-speed gear 17, and a reverse gear 18. The driven shaft 12 carries two gears 19 and 20, the former being rotatable relative to the shaft 12 and positioned axially to mesh with the gear 16 on the counter-shaft 15. The gear 20 is splined to the shaft 12 to rotate therewith, but to be axially movable from the neutral position shown in Fig. 1 into mesh either with the gear 17 to provide a low-speed drive or into mesh with a reverse idler 21, which in turn meshes with the gear 18, to provide a reverse drive.

Mounted on the shaft 12 between the gear 19 and pinion 13 is an axially slidable clutch member 23 which is splined to the shaft 12 to rotate therewith. At its ends, the member 23 is provided with annular series of clutch teeth 24 and 25 adapted to mesh respectively with internal teeth 26 and 27 provided respectively on the pinion 13 and gear 19. Between the two series of teeth 24 and 25, the member 23 has an annular groove for the reception of the usual shifter fork 28.

The transmission so far described is of a common type. The transmission is set to provide a low-speed drive by moving the gear 20 to the left (Fig. 1) to bring it into engagement with the gear 17 on the counter-shaft 15. Second-speed drive is effected by moving the shifter fork 28 and clutch member 23 to the right to bring the teeth 25 of the clutch member 23 into engagement with the teeth 27 on the gear 19, thus clutching the gear 19 to the driven shaft 12. A direct or high-speed drive is provided by moving the member 23 to the left to bring the teeth 24 into mesh with the teeth 26 on the pinion 13, thus serving to connect the shafts 11 and 12 directly.

In embodying my invention in a transmission of the type described, the pinion 13 and the gear 19 are provided with annular flanges 31 and 32 respectively which extend toward each other to overlap axially the ends of the clutch member 23. Preferably, there is fixed within each of the flanges 31 and 32 a bearing ring 33 the inner surface of each of which provides one clutch face of the friction clutch forming the synchronizing mechanism. The other member of each friction clutch is formed by a split ring 35 which is received within the associated bearing ring 33.

The two synchronizing friction clutches shown in the drawing are substantially identical; and the following description of the second-speed synchronizer will suffice to explain my invention.

As previously indicated, the ring 35 is split, and a dog 36 is received between its two ends. The dog 36 extends radially inward from the ring 35, its inner portion being received in a groove 37 provided in the adjacent end of the clutch member 23. Near its outer end, the groove 37 has parallel plane walls which are spaced apart a distance substantially equal to the thickness of the dog 36 and serve to hold the dog in the substantially radial position illustrated in Fig. 4. The ring 35 is so proportioned that when the parts are in the positions illustrated in Fig. 4 there will be a slight frictional drag between the rings 35 and 33. If the outer diameter of the ring 35 is made slightly (0.10 inches to 0.20 inches) less than the internal diameter of the ring 33, the presence of oil between the two rings will result in a slight frictional drag between them.

When the clutch member is in its neutral position, as illustrated in Figs. 1 and 2, the dog 36 is in engagement with the parallel-walled portion of the groove 37, is therefore held in substantially radial position, and has substantially no tendency to expand the ring 35 if the ring 35 and its associated bearing ring 33 tend to rotate relatively at different speeds. Inwardly from the parallel-walled portion of the groove 37, however, the groove walls are oppositely inclined, as indicated in Fig. 5, to permit the dog to tilt when it is out of engagement with the parallel-walled portion of the groove. The parts are so proportioned that when the clutch member 23 is moved from neutral position, in which the dog is received between the parallel-walled portion of the groove, toward engagement with the gear 19, the parallel walls of the groove 37 will be moved out of engagement with the dog 36 before the external clutch teeth 25 on the member 23 engage the internal teeth 27 with which they are to cooperate. When this occurs, the dog 36 is freed from the support which has previously held it in radial position, and the tangential forces acting in opposite directions on the outer and inner ends of the dog as the result of the slight frictional drag between the rings 33 and 35, and as a result of the engagement of the inner end of the dog with the clutch member 23 tend to tilt the dog toward the position illustrated in Fig. 5. As is clear from Fig. 5, this tilting movement of the dog effects expansion of the ring 35 forcing it into gripping engagement with the associated bearing ring 33 and effects synchronization of the clutch member 23 and gear 19.

If desired, the walls of the groove 37 near the extreme inner end thereof may be made parallel in order to return the dog 36 to radial position immediately prior to engagement of the positive clutch teeth, thus releasing the friction clutch and permitting any slight angular displacement of the two positive clutch members which may be necessary to prevent end-to-end engagement of the teeth thereof.

The dog 36 may be held in fixed axial position by providing it on its outer end with a lug 36' which is received behind the associated bearing ring 33, as is clear from Fig. 2. Collars 40 may be provided on the shaft 12, such collars having shoulders which engage the inner ends of the respectively associated dogs to provide a support therefor.

The outer surface of the ring 35 is preferably interrupted at intervals by a plurality of axially extending grooves 42. Such grooves have a double purpose. In the first place, they provide for the escape of lubricant from between the rings 33 and 35, thus facilitating gripping engagement of such rings when the dog 36 is tilted. In the second place, by providing the ring 35 with the grooves 42, I am enabled to increase the radial width of the surfaces which engage the dog 36 without stiffening the ring to such an extent that its ready expansion is prevented.

It is apparent that the synchronizing mechanism above described is self-energizing, and that its actuation does not increase the effort which must be exerted by the operator in changing gear-ratios. As soon as the lateral support provided by the parallel-walled portion of the groove 37 is removed from the dog 36, the dog tilts as the result of any relative angular movement of the ring 35 and clutch member 23. This tilting movement of the dog expands the ring 35, increases the friction between it and the ring 33 and increases the lateral thrust of the member 23 which tends to tilt the dog further. Even with relatively heavy transmission parts possessing considerable momentum, I have found my synchronizing mechanism effective rapidly to bring to the same speed the positive clutch members which are about to be engaged.

It will be apparent that in the construction as so far described I depend upon friction between the ring 35 and the bearing ring 33 to tilt the dog 36 and expand the ring 35. Ordinarily, particularly if the lubricant in the transmission casing is comparatively thick, such friction as normally exists between the rings 35 and 33 is all that is necessary to tilt the dog, but in order to prevent failure of the synchronizing system by lack of friction between the rings 35 and 33, I prefer to embody in the device some means which will ensure the existence of friction between the rings 35 and 33 to tilt the dog 36 at the time of synchronizing.

To this end, I may provide clutch members 23 on each side of the groove which receives the shifter-fork 28 with an annular groove adapted to receive a split ring 45, the normal outer diameter of which is slightly greater than the inner diameter of the ring 35. The outer edge of each of the rings 45 adjacent the ring 33 is beveled to a diameter less than the internal diameter of the ring 35, and the ring 45 is so positioned axially of the clutch member 23 that its beveled surface will engage the ring 35 and expand it slightly to provide between it and the bearing ring 33 sufficient friction to tilt the dog 36 as movement of the clutch member 23 continues. If some such means as the split ring 45 is employed to insure that during synchronizing a frictional drag between the rings 33 and 35 will exist, it is not essential that the ring 35 be formed in one piece.

It will be noted from Fig. 3 that each of the grooves which receives one of the rings 45 crosses the slot in the member 23 which receives the dog 36. It is therefore necessary that some means be provided for preventing the ring 45 from becoming disposed across such slot, where it would prevent movement of the member 23 into clutching engagement. Any means for accomplishing this purpose, however, must be so arranged as to permit a slight relative rotative movement of each of the rings 45 and the member 23; for the ring 45, during the synchronizing operation, will tend to rotate with the expanding ring 35, and if prevented from rotating would not permit that movement of the ring 35 which is necessary to tilting of the dog 36. To accomplish this purpose, I may employ the means illustrated in Fig. 6, the ring 45 carrying an inwardly projecting pin 46 which is received in a groove 48 of limited angular extent in the clutch member 23. Preferably, I provide between the ring 35 and the clutch member 23 a yielding means which tends to hold the ring 45 in a position intermediate the limits of its angular movement relative to the clutch member 23. I may therefore provide between the pin 46 and each end of the groove 48 a coil compression spring 49 which yieldingly prevents the ring 45 from becoming displaced from its proper neutral position on the clutch member 23.

As already indicated, in the absence of the spring 49 there will be a tendency for the ring 45 to work in a counter-clockwise direction relative to the clutch member 23 until its movement in that direction would be limited by engagement of the pin 46 with the end of the groove 48. If the ring were in this position when the clutch member 23 was moved toward engagement with either of the members 27 or 26, and if that member were rotating in such a direction that tilting of the dog 36 would have to result from counter-clockwise rotation of the ring 35 relative to the clutch member 23, synchronization would not occur; and such rotation of the ring 35 relative to the clutch member 23 would be prevented by reason of its engagement with the ring 45 and the engagement of the pin 46 with the counter-clockwise end of the groove 48. The spring 49, however, prevents the pin 46 from reaching the end of the groove 48; and therefore, if counterclockwise rotation of the ring 35 relative to the clutch member 23 is necessary to effect synchronization, such rotation will not be prevented.

I claim as my invention:

1. In combination, two relatively rotatable co-axial clutch members provided with clutch teeth, said two members being relatively axially movable from and toward a neutral position to effect engagement and disengagement of said clutch teeth, one of said members being provided with an axial recess, an expansible member disposed within said recess, said expansible member having an axially extending slot, an actuating member disposed in said slot and tiltable in a transverse plane from a normal position to expand said expansible member into gripping engagement with the walls of its associated recess, means on said unrecessed clutch member engageable with said actuating member to cause said actuating member to tilt and expand said expansible member when the two clutch members tend to rotate relatively at different speeds, and provisions rendered inoperative by relative axial movement of said two clutch members toward engagement for holding said actuating member in normal position when said two clutch members are in neutral position.

2. In combination, two relatively rotatable co-axial clutch members provided with clutch teeth, said two members being relatively axially movable from and toward a neutral position to effect engagement and disengagement of said clutch teeth, one of said members being provided with an axial recess, an expansible member disposed within said recess, an actuating member operatively connected to said expansible member and tiltable in a transverse plane from a normal position to expand said expansible member into gripping engagement with the walls of its associated recess, means on said unrecessed clutch member engageable with said actuating member to cause said actuating member to tilt and expand said expansible member when the two clutch members tend to rotate relatively at different speeds, and provisions rendered inoperative by relative axial movement of said two clutch members toward engagement for holding said actuating member in normal position when said two clutch members are in neutral position.

3. The invention set forth in claim 1 with the addition of means carried by said unrecessed clutch member and engageable with said expansible member to exert a radial pressure thereon when said two clutch members move relatively toward engagement.

4. The invention set forth in claim 2 with the addition of means carried by said unrecessed clutch member and engageable with said expansible member to exert a radial pressure thereon when said two clutch members move relatively toward engagement.

5. In combination, two relatively rotatable co-axial clutch members provided with clutch teeth, said two members being relatively axially movable from and toward a neutral position to effect engagement and disengagement of said clutch teeth, a friction-clutch element associated with one of said clutch members, an actuating member associated with said friction clutch element and tiltable from a normal position to cause said friction-clutch element to grip its associated clutch member, said actuating member being operatively connected to the other of said clutch members to be tiltable from normal position by relative rotation of such clutch member and friction-clutch element, and means rendered inoperative by relative movement of said two clutch members toward engagement for holding said actuating member in normal position when said two clutch members are in neutral position.

6. Synchronizing mechanism for a positive clutch having two co-axial relatively rotatable clutch members one of which is provided with a recess, said mechanism comprising an expansible friction-clutch element disposed within said recess and expansible into gripping engagement with the wall thereof, an actuating member associated with said expansible element and movable from a normal position by relative rotation of said two members to expand said expansible element, and provisions on said unrecessed member for holding said actuating member in normal position, said provisions being selectively disengageable from said actuating member.

7. In combination, a pair of co-axial relatively rotatable members, one of said members being provided with a recess, an expansible friction-clutch element disposed within said recess and expansible into gripping engagement with the wall thereof, an actuating member associated with said expansible element and movable from a normal position by relative rotation of said two members to expand said expansible element, and provisions on said unrecessed member for holding said actuating member in normal position, said provisions being selectively disengageable from said actuating member, said expansible element being permanently in light frictional engagement with said recessed member so as always to tend to rotate therewith.

JARL M. WEYDELL.